TAPE HANDLING APPARATUS

Filed Dec. 19, 1967

Inventor:
JAMES P. WATSON
BY H. Christoffersen
Attorney 3,490,669

TAPE HANDLING APPARATUS

James P. Watson, Jupiter, Fla., assignor to RCA Corporation, a corporation of Delaware Filed Dec. 19, 1967, Ser. No. 691,811
Int. Cl. G11b *15/29*; B65h *17/22*
U.S. Cl. 226—176 8 Claims

ABSTRACT OF THE DISCLOSURE

A tape drive roller mechanism having an actuable plunger acting directly on a first yoke carrying the roller while a second yoke is attached to the first yoke to guide the direction of motion of the roller. The second yoke is carried on a shaft having adjustable pivots while a return spring is located on the opposite side of the shaft from the roller.

BACKGROUND OF THE INVENTION

Tape drive mechanisms have been used in magnetic tape transports for driving magnetic tape which can be used to store either digital or analog data. In either application, it is desirable to quickly bring the tape to its operating speed and to accurately drive the tape without inducing any mechanical misalignment thereof. To insure a high speed operation, particularly in the case of a so-called fast start-stop digital tape transport which can operate at a 600 cycle-per-second rate, the moving mass of the roller apparatus must be kept at a minimum. On the other hand, to insure an accurate tape drive, the orientation of the roller to a drive capstan must be adjustable in order to maintain the respective contacting surfaces of the roller and the capstan absolutely parallel. Further, the roller mechanism must be rigid and capable of operation at high speed without inducing mechanical oscillations. Prior art tape drive mechanisms, such as that shown in the Patent No. 3,233,801 of Daniel J. Wray, have been incapable of fully supplying the aforesaid operating characteristics due to inherent structural deficiencies which have caused mechanical instability at high operating speeds.

BRIEF SUMMARY OF THE INVENTION

In the illustrated embodiment of the present invention, a pinch roller is suspended on an axle passing through the legs of a pair of yokes. The yokes are disposed at substantially a right angle with respect to each other. A selectively actuable solenoid plunger is attached to one yoke to displace the roller along a predetermined path to engage a tape with a drive capstan. The second yoke is supported on a shaft which allows it to follow the motion of the first yoke induced by the plunger. Means are provided on the shaft for adjusting the position thereof with respect to the plunger, which adjustment is translated into a corresponding shift of the pinch roller with respect to the drive capstan.

DETAILED DESCRIPTION OF THE INVENTION

Figure 1:
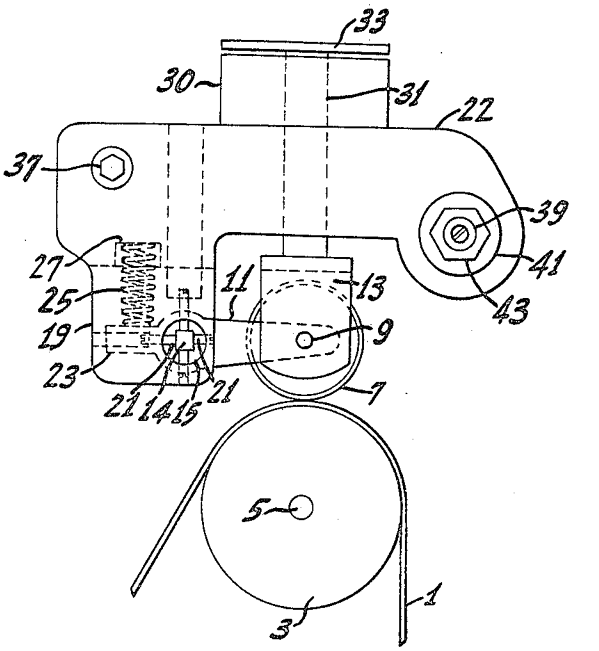
FIGURE 1 is a pictorial side view of a tape drive apparatus embodying the present invention.
Figure 2:
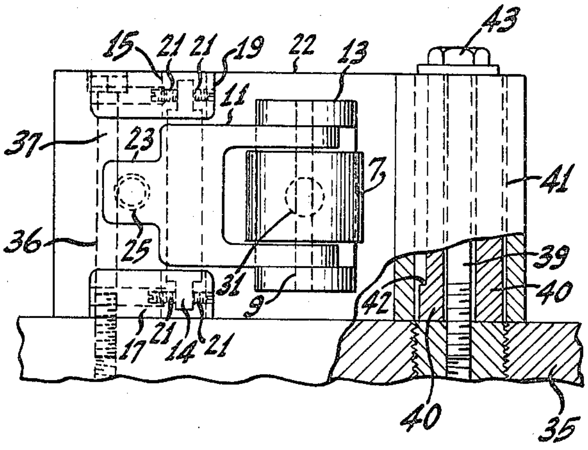
FIGURE 2 is a bottom view, shown in partial cross-section, of the apparatus illustrated in FIGURE 1.

Referring to FIGURES 1 and 2 in more detail, there is shown a tape drive apparatus for positively and uniformly driving a tape 1. The tape 1 is supported on a capstan 3 rotatably driven by a capstan drive shaft 5. A pinch roller 7 is rotatably supported on an axle 9. The axle 9 is supported in a pair of yokes 11, 13. The longitudinal centerline of the axle 9 is arranged to lie in a plane which passes through the longitudinal centerline of the drive shaft 5.

This relationship is maintained by mechanical adjustments of the position of the roller 7, as hereinafter explained.

The yokes 11, 13 are illustrated in an approximately mutually orthogonal, or perpendicular relationship, with the ends of the legs of first yoke 11 positioned within the space defined by the legs of second yoke 13. The roller 7 is held between the legs of the first, or inner, yoke 11 on the axle 9 which passes through the ends of the legs of both yokes 11, 13. The outer ends of the axle 9 are fastened by any suitable means within the axle holes in the second yoke 13. The legs of the first yoke 11 and roller 7, on the other hand, are both free to turn on the axle 9. A support shaft 14 for the first yoke 11 is positioned within a transverse bore in the body of the first yoke 11. The shaft 14 is substantially parallel to and spaced from the axle 9 and is arranged to allow for a rotation of the yoke 11 thereon. Both of the ends of shaft 14 are prepared as four-sided rods with flat surfaces. These ends are inserted into corresponding oversize holes 15 in parallel frame extension members 17 and 19.

Each end of the shaft 14 is carried on four adjustable screws 21 which are threaded into respective holes in the frame extension members 17, 19 and project into the holes 15. These screws bear against corresponding ones of the flat surfaces of the shaft 14 to prevent the shaft 14 from turning, while enabling a displacement of the shaft 14 with respect to the frame extensions 17, 19. The frame extensions 17, 19 are each attached at one end to a frame base 22. The extensions 17, 19 are spaced from each other a distance which is sufficient to permit a rotation of the yoke 11 on the shaft 14. A projecting tab 23 is provided on the end of the first yoke 11 opposite to the end carrying the roller 7. A return spring 25 is supported between the tab 23 and an aperture 27 in the base 22.

A solenoid means 30 is attached to the base 22 above the second yoke 13. A plunger 31 for the solenoid 30 is pivotally attached to the center of the yoke 13 with the centerline of the plunger 31 being aligned with the centers of the roller 7 and the capstan 3. A cap 33 is attached to the other end of the plunger 31 above the top of the solenoid 30 to provide a return path for the magnetic field of the solenoid 30 and may be used to limit the movement of the plunger 31 by the solenoid 30.

The base 22 is attached at one end to a supporting structure 35 by a first shoulder screw 37 located in a bore 36 which is substantially parallel to the holes 15. The other end of the base 22 is also attached to the supporting structure 35 by a second shoulder screw 39. However, the second screw 39 is located within a cylindrical tube 40 with the head of the screw 39 engaging an outer end 43 of the tube 40. This outer end 43 of tube 40 has a hexagonal contour to permit an adjustment, or rotation, of the tube 40 on the screw 39. The tube 40 is located within an elliptical hole 41 in the base 22, which hole has a major axis passing through the center of the hole 36 and is parallel to hole 36. The inner end of the tube 40 is provided with a cam surface 42 adjacent to the point of securement of the screw 39 in the supporting structure 35. The cam 42 is positioned against the inner surface of the hole 41 and proportioned to operate along the minor axis of the hole 41 since movement of the major axis is restrained by the screw 36.

In operation, the tape drive apparatus shown is positioned in a non-actuated state with the pinch roller 7 located above the tape 1 and spaced therefrom. When the solenoid 30 is energized, the plunger 31 is moved toward the capstan 3 over a distance determined by the preset spacing of the pinch roller 7 from the capstan 3. This motion of the plunger 31 is transmitted to the pinch roller 7 by the yoke 13 and the shaft 9 to move the pinch roller 7 into engagement with the tape 1 and the capstan 3. Since the capstan 3, at this time, is continuously driven, the tape 1 is pressed against the capstan 3 and driven thereby. As previously mentioned, the tape 1 must be accurately driven in order to maintain fidelity in the recording and reproducing operation. Such an accuracy can only be achieved if the axial centerline of the pinch roller 7 is parallel to the axial centerline of the capstan 3.

The illustrated embodiment of the invention has adjusting means for insuring that this alignment is achieved, e.g., the screws 21 are adjusted to properly position the ends of the shaft 14 in the holes 15. This alignment of the shaft 14 causes the yoke 11 to move in a corresponding direction. This movement of the yoke 11 is applied to the yoke 13 and the pinch roller 7 by the interconnecting shaft 9. Thus, the pinch roller 7 can be adjusted around the centerline of the plunger 31 and around a line perpendicular to this centerline and passing through the center of the roller 7 and the shaft 13. The connection between the yoke 13 and the plunger 31 is a flexible one, i.e., pivotal, designed to accommodate this movement while allowing the plunger 31 to transmit an actuating force to the yoke 13. For example, the lower end of the plunger 31 may be threaded to engage a threaded cylinder loosely positioned in a hole in the body of the yoke 13, with the cylinder entering the yoke 13 at a right angle to the plunger 31.

The spacing of the roller 7 from the capstan 3 is controlled by an adjustment of the tube 40 around the screw 39. Such an adjustment causes the cam surface 42 to move along the inner wall of the hole 41. Since the direction of the maximum diameter of the cam 42 with respect to the centerline of screw 39 is, thus, changed, the spacing of the hole 41 from the screw 39 is correspondingly altered along minor axis of hole 41. As a result, the frame 22 is pivoted around the screw 37 to vary the roller-to-capstan spacing. Since the air gap between the solenoid 30 and the plunger 31 is unaltered by any of these aforesaid adjustments, the actuating force exerted by the roller 7 and the rapidity of operation thereof are kept at a predetermined level. Additionally, since the spring 25 is constantly exerting a return force on the yokes 11 and 13, the roller 7, the shaft 9 and the plunger 31, any tendency of these mechanical components to vibrate, or oscillate, is effectively dampened to a negligible level.

What is claimed is:

1. In combination, a roller, a yoke, a first shaft passing through the legs of said yoke and rotatably supporting said roller, means operative to apply a force to said roller, a supporting frame, a second shaft parallel to said first shaft adjustably supported at each end in said frame and arranged to rotatably support said yoke, and a return spring means disposed between said frame and said yoke on the opopsite side of said shaft from said roller.

2. In combination, a roller, a yoke, a first shaft passing through the legs of said yoke and rotatably supporting said roller, means including a second yoke having legs encompassing said roller and supporting the ends of said first shaft operative to apply a force to said roller, a second shaft parallel to said first shaft and arranged to rotatably support said yoke, and a return spring means disposed on said yoke on the opposite side of said second shaft from said roller.

3. A combination as set forth in claim 2, wherein said means further includes a driving solenoid means, a solenoid means, a solenoid plunger and pivotal connecting means connecting said plunger to said second yoke while allowing a rotation of said second yoke thereon.

4. A combination as set forth in claim 3, and including a frame means supporting said second shaft to maintain said second yoke at substantially a right angle with respect to said first yoke.

5. A combination as set forth in claim 4, and including means in said frame for adjusting the position of said second shaft with respect to said frame.

6. The combination as set forth in claim 1, wherein the means for adjustably supporting the first shaft comprises four screws spaced 90° apart at each end of the first shaft, each set of four screws passing through the frame, and each set permitting adjustment of a shaft end in two directions.

7. The combination as set forth in claim 1, wherein the structure set forth is symmetrical about a plane which is perpendicular to and bisects said first shaft.

8. The combination as set forth in claim 7, wherein said supporting frame is formed with parallel mounting surfaces, one on each side of said plane, and further including mounting means for securing said supporting frame to a base with either mounting surface against said base.

References Cited

UNITED STATES PATENTS

| | | | |
|---|---|---|---|
| 3,148,819 | 9/1964 | Frick et al. | 226—176 |
| 3,233,807 | 2/1966 | Wray | 226—180 |

M. HENSON WOOD, Jr., Primary Examiner

U.S. Cl. X.R.

226—180

UNITED STATES PATENT OFFICE
CERTIFICATE OF CORRECTION

Patent No. 3,490,669 Dated January 20, 1970

Inventor(s) James Power Watson

It is certified that error appears in the above-identified patent and that said Letters Patent are hereby corrected as shown below:

In Column 4, lines 13 and 14, cancel "a solenoid means,".

SIGNED AND SEALED
DEC 22 1970

DEC. 22, 1970

(SEAL)
Attest:

Edward M. Fletcher, Jr.
Attesting Officer

WILLIAM E. SCHUYLER, JR.
Commissioner of Patents

FORM PO-1050 (10-69)

USCOMM-DC 60376-P6I
★ U.S. GOVERNMENT PRINTING OFFICE : 1969 O—366-33